United States Patent [19]

Yokota

[11] Patent Number: 4,988,171
[45] Date of Patent: Jan. 29, 1991

[54] IMAGING DEVICE AND ENDOSCOPE SYSTEM PROVIDED WITH THE SAME

[75] Inventor: Akira Yokota, Sagamihara, Japan

[73] Assignee: Olympus Optical Co., Ltd., Tokyo, Japan

[21] Appl. No.: 198,058

[22] Filed: May 24, 1988

[30] Foreign Application Priority Data

May 25, 1987 [JP] Japan ............................. 62-127458

[51] Int. Cl.⁵ .............................................. G02B 5/30
[52] U.S. Cl. ......................................... 350/404; 128/6
[58] Field of Search .............. 350/400, 401, 403, 404; 358/331, 55; 128/6; 358/90, 91

[56] References Cited

U.S. PATENT DOCUMENTS

| | | | |
|---|---|---|---|
| 3,940,788 | 2/1976 | Abe et al. | 350/167 |
| 4,472,735 | 9/1984 | Shinozaki et al. | 350/167 |
| 4,575,193 | 3/1986 | Greivenkamp, Jr. | 350/401 |
| 4,676,593 | 6/1987 | Aduchi et al. | 350/404 |
| 4,760,839 | 8/1988 | Nagasaki | 350/401 |
| 4,761,682 | 8/1988 | Adaida | 250/404 |
| 4,805,028 | 2/1989 | Nishioka et al. | 358/55 |
| 4,807,981 | 2/1989 | Takizawa et al. | 350/404 |

FOREIGN PATENT DOCUMENTS 3414713 10/1984 Fed. Rep. of Germany .
3515020 11/1985 Fed. Rep. of Germany .

Primary Examiner—Bruce Y. Arnold
Assistant Examiner—Ryan
Attorney, Agent, or Firm—Cushman, Darby & Cushman

[57] ABSTRACT

An image forming optical system provided with an image forming lens forming an object, as an image, having large spectrum components in a specific spatial frequency on an image receiving device performing discretely spatial sampling and an optical low-pass filter that a response is reduced to zero in the specific spatial frequency or in a frequency in the vicinity thereof, in order to reduce large spatial frequency spectrum components in the image of the object which cause a false signal and moiré and to thereby make it possible to photograph and observe a clear object image.

14 Claims, 8 Drawing Sheets

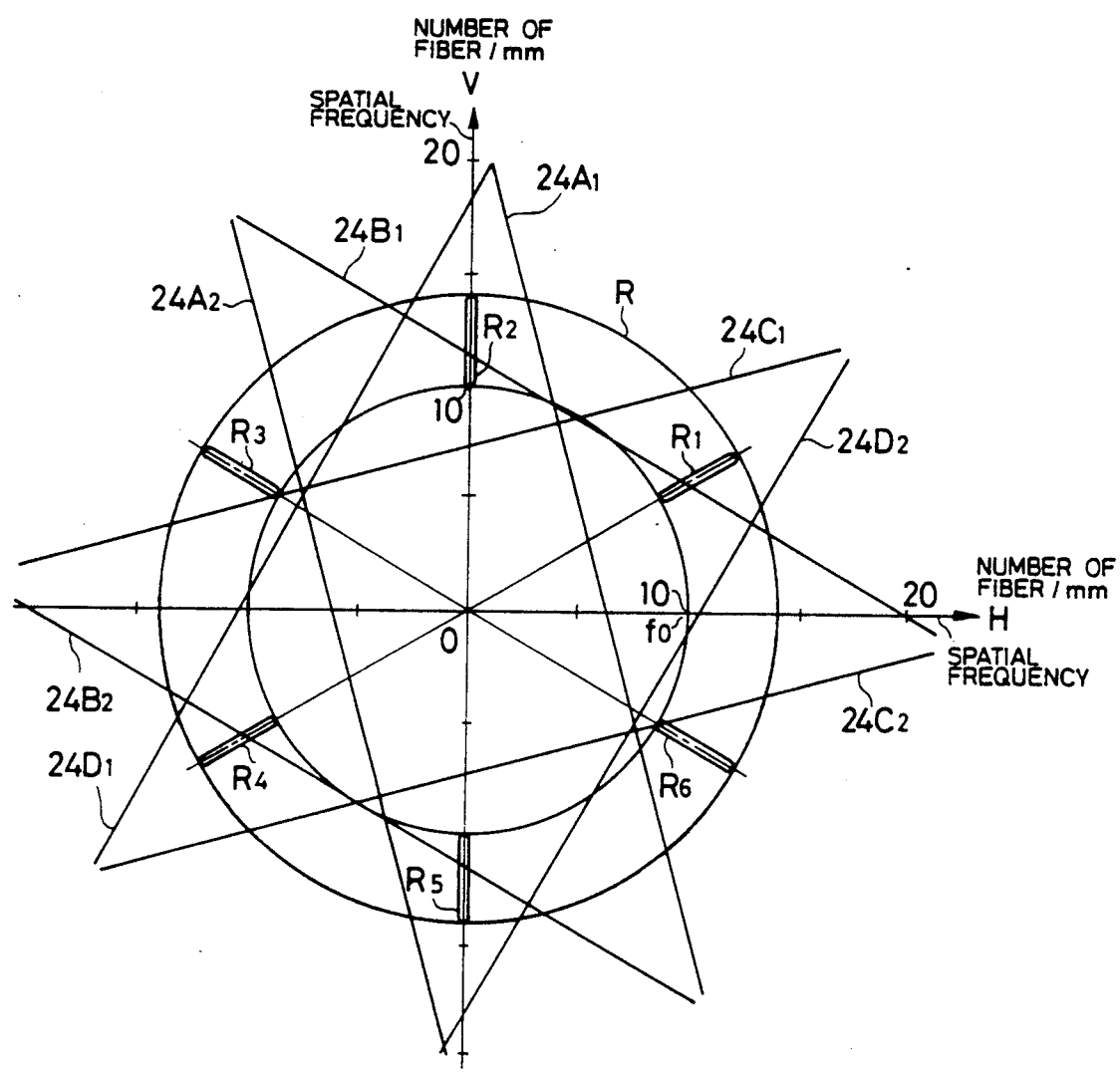

IMAGING DEVICE AND ENDOSCOPE SYSTEM PROVIDED WITH THE SAME

BACKGROUND OF THE INVENTION (a) Field of the Invention:

The present invention relates to an image forming optical system and particularly to an image forming optical system including an optical low-pass filter.

(b) Description of the Prior Art:

In an optical instrument carrying out the spatial sampling of an object image for photographing like a television camera using a CCD (charge coupled device), as an image pickup device, equipped with a color encoding filter such as a color mosaic filter and a color striped filter, a false signal is inevitably generated, termed aliasing or moiré, due to beats caused by the spatial frequency and sampling frequency of the object image. Since the sampling of the object image is carried out with respect to various frequencies depending on an array of respective color elements of the color mosaic filter and an array of pixel elements of the CCD, the false signal is also produced in various frequencies. In order to diminish the generation of such a false signal, an optical low-pass filter has been provided in an image forming optical system of the optical instrument of the type. In general, the optical low-pass filter is constructed so that a plurality of birefringent plates such as quartz plates are properly combined with each other and the response of the image forming optical system is reduced to zero in respective sampling frequencies, thereby suppressing spatial frequency spectra of the object image in the vicinity of respective sampling frequencies.

Although the filter constructed as mentioned above fails usually to bring about problems in particular, a problem arises that if a frequency component similar to the sampling frequency among the spatial frequency spectra of the object image is considerably large, it is not completely suppressed and consequently the generation of the false signal cannot be prevented.

Specifically, such an instance occurs in the case where the object image derived from a fiberscope is photographed with a TV camera and will be described in the following. FIG. 1 depicts typically a structure for photographing the image derived from the fiberscope with a TV camera. Reference numeral 1 represents a fiberscope, which is provided with an objective lens unit 2 in a distal end portion and an image guide fiber bundle 3 in an inside portion. An entrance end face of the image guide fiber bundle 3 is arranged at an image forming position established by the objective lens unit 2 and an exit end face is located in an eyepiece section 4. Further, an eyepiece 5 is provided in the rear thereof. Reference numeral 6 represents an adaptor for mounting a TV camera 7 to the eyepiece section 4 of the fiberscope in which an image forming lens 8 is housed. In the TV camera 7 are arranged an optical low-pass filter 9 and a CCD 11 having a color mosaic filter 10 on its entrance surface. It follows from this that an object 12 is formed as an image on the entrance end face of the image guide fiber bundle 3 through the objective lens unit 2 and then the image transmitted onto the exit end face is reformed by means of the eyepiece 5 and the image forming lens 8 through the optical low-pass filter 9 on the CCD 11. Here, the exit end face of the image guide fiber bundle 3 is formed from light spots distributed in a dot shape as shown in FIG. 2A because light is transmitted only by core portions of individual fibers. Therefore, the object image appearing on the exit end face, for example, the distribution of light intensity at each spot position lying along a line A has a fine structure similar to the case where amplitude modulation (AM) of a fundamental wave depending on the repetition of cores as shown in FIG. 2B is produced by the intensity distribution of light of the object. As a result, a very large spectrum component exists in the spatial frequency corresponding to the fundamental wave and a common optical low-pass filter having a point where the response is a zero in the sampling frequency cannot completely suppress the large spectrum component, so that the false signal will remain.

The same phenomenon occurs also in the case where a lecture scope is utilized for observation. FIG. 3 shows typically a structure for observing the image transmitted by the fiberscope through the lecture scope, and the fiberscope per se is the same as in FIG. 1. The lecture scope 21 mounted to the eyepiece section houses a beam splitter 22, an image forming lens 23, an optical low-pass filter 24, an image guide fiber bundle 25, and an eyepiece 26 and is adapted to form the object image transmitted onto the exit end face of the image guide fiber bundle 3, through the eyepiece 5 and the image forming lens 23, onto an entrance end face of the image guide fiber bundle 25 and to transmit the image onto an exit end face of the image guide fiber bundle 25, thus observing it through the eyepiece 26. In such a case, since the image guide fiber bundle 25 transmits only light received through the core portions of individual fibers, it follows that the object image is sampled in the spatial frequency depending on the repetition of cores. Also, the exit end face of the image guide fiber bundle 3 on which an object image is formed has a large spectrum component in the repetition frequency of the core, with the result that if such an optical low-pass filter that the response is reduced to zero in the sampling frequency of the image guide fiber bundle 25 is employed, the moiré remains likewise.

SUMMARY OF THE INVENTION

In view of the above circumstances, a primary object of the present invention is to provide an image forming optical system suitable for reducing the generation of aliasing, moiré and the like in spatial sampling of an image of an object having a large spectrum component in a specific spatial frequency as in fiberscopes and dot printed photographs.

Another object of the present invention is to provide an image forming optical system making it possible to photograph and observe an always clear object image.

The image forming optical system according to the present invention is provided with an image forming lens forming an image of an object having a large spectrum component in a specific spatial frequency onto an image receiving device performing discretely spatial sampling and an optical low-pass filter that the response is reduced to zero in the specific spatial frequency or in a frequency in the vicinity thereof. According to the structure of the image forming optical system, the spatial frequency spectrum component of the object image to which the generation of an intensive false signal, moiré and the like is attributable is considerably reduced, so that the false signal, moiré and the like can largely be diminished.

These and other objects as well as the features and the advantages of the present invention will become apparent from the following detailed description of the preferred embodiments when taken in conjunction with the accompanying drawings.

BRIEF DESCRIPTION OF THE DRAWINGS

FIG. 8 is a view showing spatial frequency spectra and characteristics of an optical low-pass filter in a third embodiment of the present invention;

DESCRIPTION OF THE PREFERRED EMBODIMENTS

The first embodiment

Figure 5A:
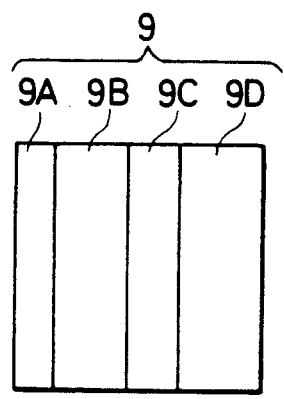
FIGS. 5A, 5B and 5C are views showing a structure of the optical low-pass filter in the first embodiment.
Figure 5B:
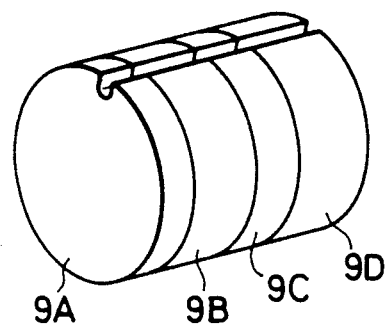
Figure 5C:
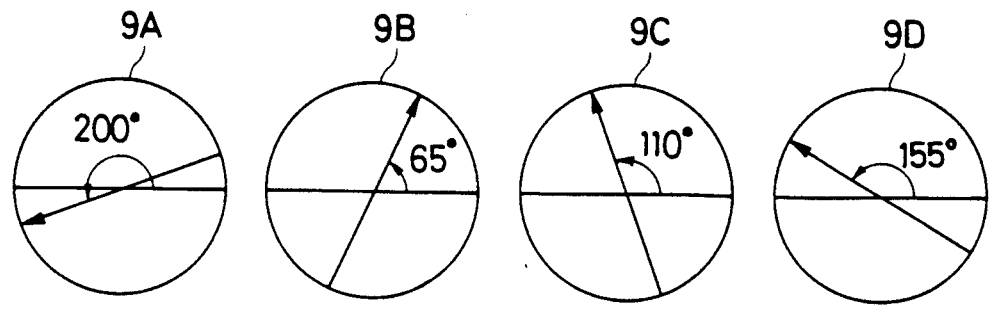
Figure 4:
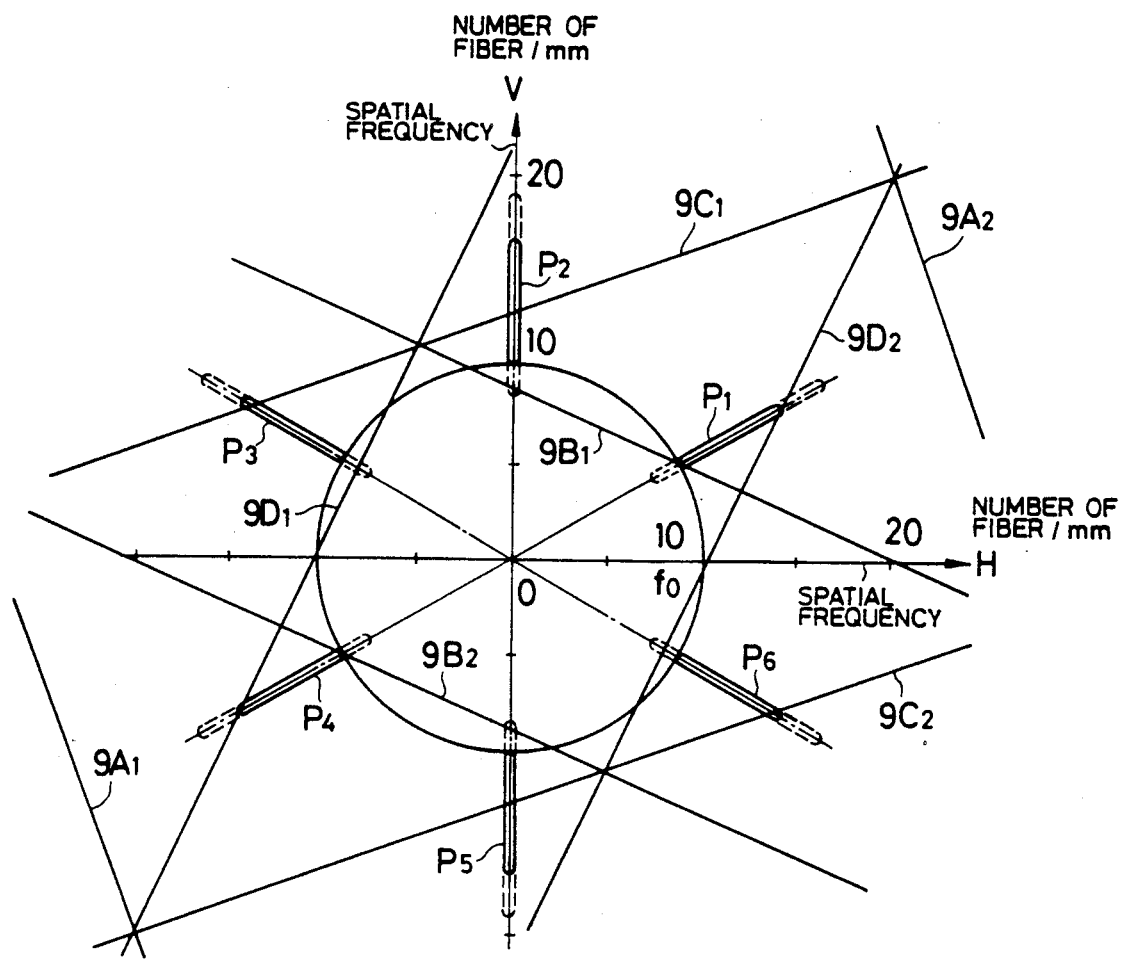
FIG. 4 is a view showing spatial frequency spectra and characteristics of an optical low-pass filter in a first embodiment of an image forming optical system according to the present invention.

The first embodiment is adapted to photograph an image derived from a fiberscope by a color television camera with a single solid state image pickup device, and since the entire structure is precisely the same as that of a conventional example shown in FIG. 1, the following explanation will be made referring to FIGS. 1, 2, 4, 5A and 5B. According to an image forming optical system of the present invention, an image transmitted to the exit end face of the image guide fiber bundle 3 is formed through the eyepiece 5 and the image forming lens 8 on to the CCD 11. In such a case, assuming that the diameter of each fiber constituting the image guide fiber bundle 3 is represented by $\phi$ and the magnifications of the eyepiece 5 and the image forming lens 8 are $\beta_1$ and $\beta_2$, respectively, the diameter of each fiber in an image formed onto the CCD 11 is expressed by $\phi' = \phi \times \beta_1 \times \beta_2$. Since individual fibers are arrayed to form a so-called close-packed charging structure, it follows that the spatial frequency spectra of the object image formed on the CCD 11 are derived from Fourier transform thereof. Also, the values of $\phi 60$ and $\beta_1$ depend on the type of fiberscope and $\beta_2$ on the adaptor. The value of $\phi'$ varies in accordance with the combination of these factors. Thus, when the maximum and minimum values of $\phi'$ secured by the combination of the fiberscope with the adaptor practically used are connected and the spatial frequency spectra are drawn in such a manner that a direction A shown in FIG. 2, namely, a transverse direction of fibers adjacent to each other coincides with a horizontal scanning direction of the CCD 11, the result is as shown in FIG. 4. That is, a spatial frequency spectrum component caused by an array of fibers will exist in any frequency within linear frequency areas indicated by symbols $P_1$ through $P_6$ in FIG. 4. Consequently, if the optical low-pass filter is constructed so that the response is reduced to zero in the frequency areas or in the vicinity thereof, a desired end will be achieved. FIGS. 5A, 5B and 5C show a practical structure of the optical low-pass filter 9. Specifically, as shown in FIG. 5A, the optical low-pass filter 9 comprises four birefringent plates 9A, 9B, 9C and 9D, and when a light ray splitting direction of each plate splitting incident light ray into ordinary and extraordinary rays and a thickness of each plate determining the amount of split of the light ray are properly defined, the optical low-pass filter with desired characteristics is available. In such a case, if the optical low-pass filter is constructed so that these birefringent plates are provided with notches on their peripheries and so that when the notches are aligned as shown in FIG. 5B, a mutual relation of the light ray splitting direction between the plates is properly set, its manufacture is facilitated. Here, a basic consideration for selecting the thickness and the light ray splitting direction of each plate is as follows. In general, the response per se of the image forming optical system composed of the eyepiece 5 and the image forming lens 8 decreases as the spatial frequency increases. Therefore, where the spectrum component caused by the array of fibers exists in a low frequency area within the frequency areas indicated by $P_1$ through $P_6$ in FIG. 4, the generation of the moiré and false signal is more remarkable. Thus, if the optical low-pass filter is designed so that the response is reduced to zero in the vicinity of lower limit values within the frequency areas indicated by $P_1$ through $P_6$ and so that the response becomes zero also in the other frequencies within these frequency areas, the response will be suppressed very low over the entire frequency areas, though mainly in the low frequency area. Since the relation expressed by the following formulas exists between a frequency f that the response is reduced to zero (that is, distances from an origin of coordinate to trap lines $9A_1$, $9A_2$; $9B_1$, $9B_2$; $9C_1$, $9C_2$; $9D_1$, $9D_2$ in FIG. 4) and the thickness of the birefringent plate, if the position of the trap line is determined, the thickness of the birefringent plate can easily be selected.

$$S = \frac{\left(\frac{1}{n_0}\right)^2 - \left(\frac{1}{n_e}\right)^2}{\left(\frac{\sin \psi}{n_e}\right)^2 + \left(\frac{\cos \psi}{n_0}\right)^2} \sin 2\psi \cdot d$$

$$f = \frac{1}{2S}$$

where S is the distance between ordinary and extraordinary rays caused by the birefringent plate, $n_0$ and $n_e$ are refractive indexes relative to the ordinary and extraordinary rays of the birefringent plate, respectively, $\psi$ is the angle made by a normal of the plane of incidence of the birefringent plate with an optic axis, and d is the thickness of the birefringent plate.

When quartz plates formed so that the optical axis makes an angle of 45° with the plane of incidence are employed as the birefringent plates on the basis of the above consideration, the thickness and the light ray splitting direction of each plate are determined as described in the following and thereby a favorable result has been brought about That is, when assumption is made that $f_0=10$ lines/mm, the splitting directions of individual plates make angles of 200°, 65°, 110°, and 155° with the horizontal scanning direction of a television camera as shown in FIG. 5C and the thicknesses are 3.388 mm, 10.537 mm, 7.0558 mm, and 9.448 mm, respectively. In such an instance, trap lines (namely, lines exhibiting such frequencies that the response is reduced to zero through individual plates) are arranged as shown by straight lines of symbols $9A_1, 9A_2; \ldots;$ and $9D_1, 9D_2$ on a two-dimensional spatial frequency plane in FIG. 4. It is noted that individual plates are constructed so that the response becomes zero in the vicinity of the lower limit frequency of the frequency areas $P_1$ and $P_2$ on the trap line $9B_1$, $P_3$ on $9D_1$, $P_4$ and $P_5$ on $9B_2$, and $P_6$ on $9D_2$, and so that these trap lines and $9C_1$ and $9C_2$ provide further points where another response becomes zero within the frequency areas $P_1$ through $P_6$ Here, in the case where the response is reduced to zero, for example, in the vicinity of the frequency area $P_1$, it has become evident from the results of experiments that when the trap line is arranged to be positioned in the range of about 15% of the frequency area toward the outside from each of the upper and lower limit frequencies, a complete effect of false signal elimination is brought about. Namely, when a visual field is observed in this about 15% outside frequency area, trap lines are arranged so that two trap lines exist, without exception, in each frequency area. Also, trap lines $9A_1$ and $9A_2$ are to suppress a high order frequency spectrum component caused by the fiber array and have no appreciable effect on the frequency areas $P_1$ through $P_6$ (which is such an extent that the entire response is somewhat reduced) Further, as will be obvious from symmetry depicted in FIG. 4, even if the entire optical low-pass filter is rotated by the angle multiplying integer by an angle of 60° about an optical axis, a substantial same effect of false signal elimination can be secured.

The second embodiment

Figure 1:
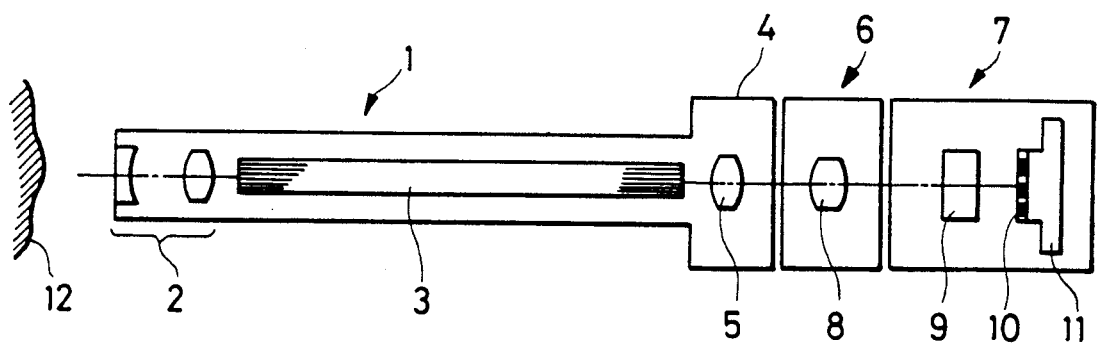
FIG. 1 is a view showing typically a conventional example mounting a TV camera to a fiberscope through an adaptor.
Figure 2A:
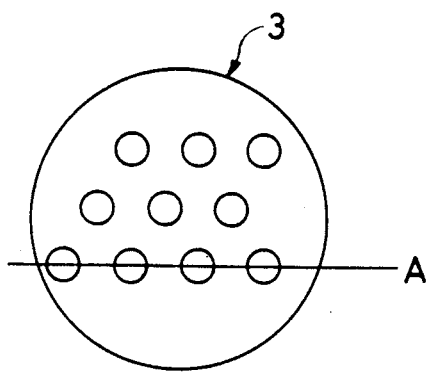
FIGS. 2A and 2B are views for explaining a state of the exit end face of an image guide fiber bundle shown in FIG. 1.
Figure 2B:
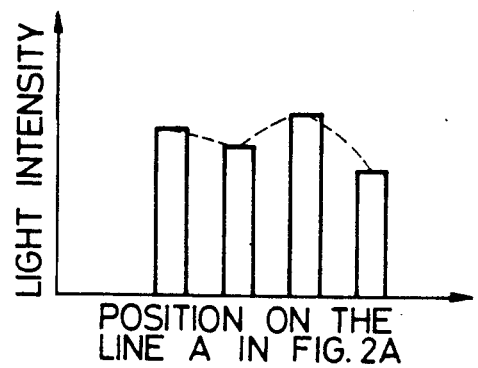
Figure 6:
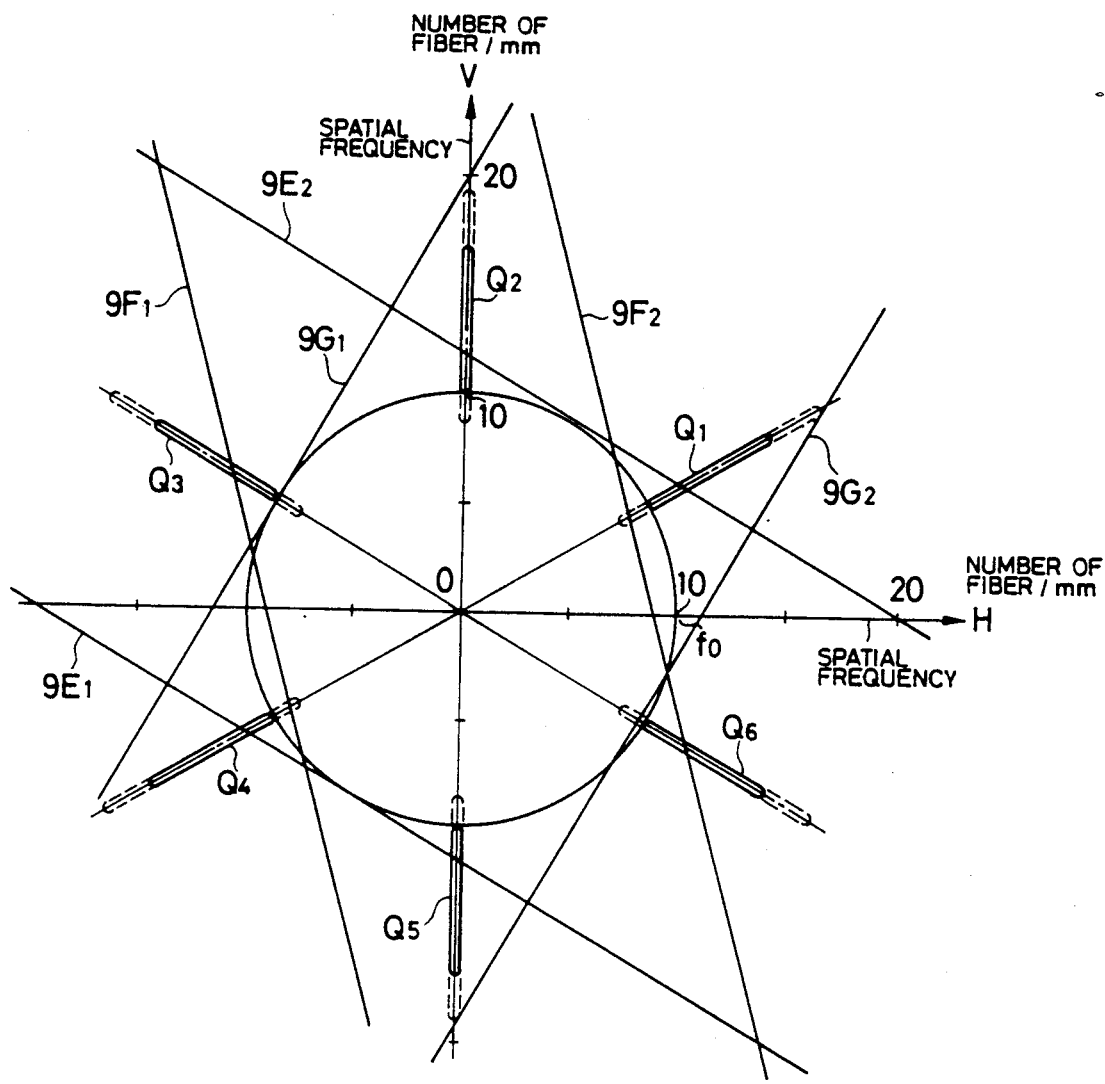
FIG. 6 is a view showing spatial frequency spectra and characteristics of an optical low-pass filter in a second embodiment of the present invention.
Figure 7A:
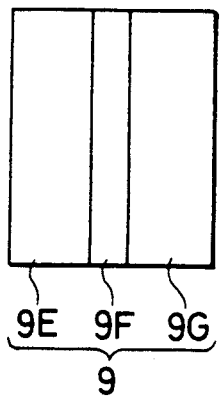
FIGS. 7A and 7B are views showing a structure of the optical low-pass filter in the second embodiment.
Figure 7B:
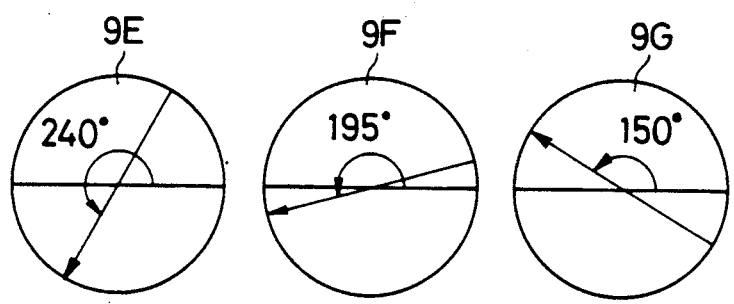

This embodiment is adapted to photograph an image derived from a fiberscope by a color television camera with a single solid state image pickup device as in the first embodiment, and the entire structure is exactly the same as that shown in FIG. 1. Therefore, the following explanation will be made referring to FIGS. 1, 6, 7A, and 7B. The spatial frequency spectrum components attributable to the fiber array of the image of the exit end face of the image guide fiber bundle 3 are distributed in the frequency area indicated by $Q_1$ through $Q_6$ in FIG. 6. The optical low-pass filter 9 for eliminating the false signal caused by the above state comprises three birefringent plates 9E, 9F, and G as shown in FIG. 7A and, in the case where the quartz plates are employed as in the first embodiment, each plate specified in the following will bring about a favorable result. That is, assuming that $f_0=10$ lines/mm, the splitting directions of individual plates make angles of 240°, 95°, and 150° with the horizontal scanning direction as shown in FIG. 7B and the thicknesses are 10.102 mm, 8.602 mm, and 8.761 mm, respectively. The positions of the trap lines produced by this formation are as indicated by symbols $9E_1, 9E_2; \ldots;$ and $9G_1, 9G_2$ in FIG. 6 and, in each of frequency areas $Q_2$ and $Q_5$ in a vertical direction and in the vicinity thereof, only one trap line exists. Also, a square formed by the trap lines of two birefringent plates 9E and 9G is arranged to be virtually circumscribed about a circle drawn with a line connecting the lower limit frequency $f_0$ of each of frequency areas $Q_1 \sim Q_6$ to an origin of coordinate for its radius. Therefore, although there is a fear that the false signal is somewhat generated, depending on the combination with the CCD, if the spatial frequency spectrum component resulting from the array of pixel elements of the CCD lies in a low frequency area as compared with $f_0$, that is, if the size of the pixel elements in a vertical direction increases in excess of some extent, a sufficient effect will be achieved.

The third embodiment

Figure 3:
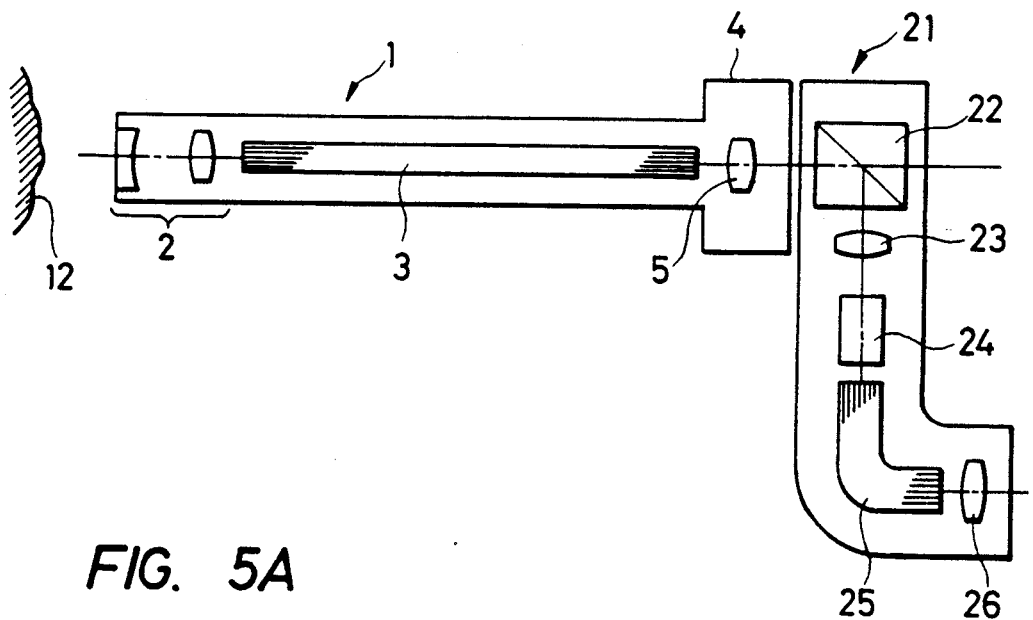
FIG. 3 is a view showing typically a conventional example mounting a lecture scope to the fiberscope.
Figure 9A:
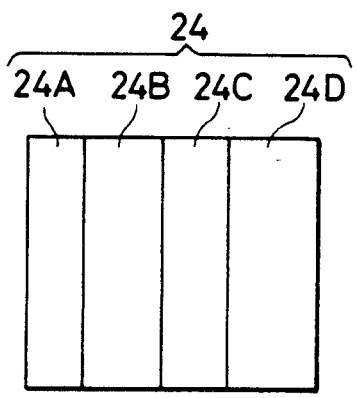
FIGS. 9A and 9B are views showing a structure of the optical low-pass filter in the third embodiment.
Figure 9B:
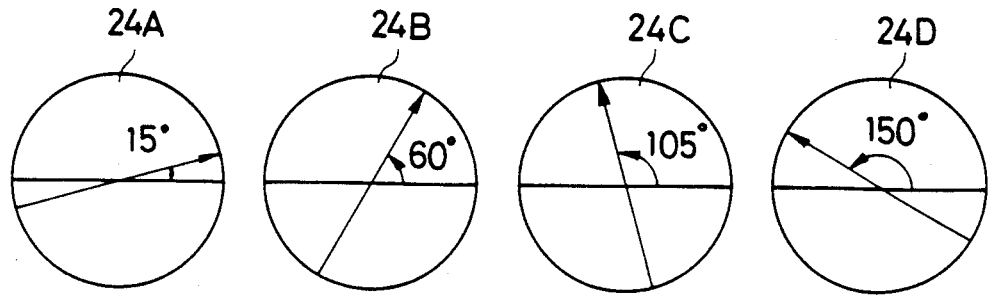

The third embodiment is to observe an image caused by a fiberscope through a lecture scope, and the entire structure is exactly the same as that shown in FIG. 3 and is such that the fiberscope 1 and the lecture scope 21 are freely rotatable each other. Accordingly, the following explanation will be made referring to FIGS. 3, 8, 9A, and 9B. When the magnification of the image forming lens 23 is taken as $\beta_3$, the diameter of each fiber in an image formed on the exit end face of the image guide fiber bundle 3 in relation to the entrance end face of the image guide fiber bundle 25 is given by $\phi'=\phi \times \beta_1 \times \beta_3$ as in the first embodiment. In a state that an array direction of fibers of fiberscope coincides with that of the image guide fiber bundle 25 of the lecture scope 21, when one array direction is taken as an axis H, the spatial frequency spectrum components caused by the fiber array due to the combination of the fiberscope used practically with the lecture scope are distributed as indicated by symbols $R_1 \sim R_6$ in FIG. 8. Because, however, both the fiberscope and the lecture scope are rotatable each other, it follows that the spectrum components exist in any position of an annular frequency area R shown in FIG. 8. An optical low-pass filter 24 for eliminating the generation of moiré attributable to such a state is composed of four birefringent plates 24A, 24B, 24C, and 24D as depicted in FIG. 9A. When these plates are taken as quartz plates like the first embodiment, the light ray splitting directions of individual plates make angles of 15°, 60°, 105°, and 150° with the array direction of fibers of the image guide fiber bundle 25 as shown in FIG. 9B and, when $f_0=10$ lines/mm, the thicknesses are 8.56 mm, 12.03 mm, 9.45 mm, and 14.13 mm, respectively. The arrangement of trap lines is shown in FIG. 8, in which three trap lines, for example, $24A_1, 24B_1,$ and $24C_1$ intersect adjacent to each other at a frequency close to the lower limit of the frequency area R and the trap lines $24A_1$ and $24C_1$ make the response zero in an area of a frequency lower than the lower limit of the area R. Also, any of the lines $24A_1, 24B_1,$ and $24C_1$ exists extendedly in the area R, in which the response is reduced to zero. Then, with respect to a circle drawn by connecting a point of the frequency $f_0$, an arrangement is such that a square formed by the trap lines of birefringent plates 24A and 24C is virtually inscribed and a square formed by the trap lines of birefringent plates 24B and 24D is virtually circumscribed. Further, the arrangement is also such that diagonals of these two square make an angle of approximately 45° with each other. Such an arrangement can prevent the moiré from being generated. Further, the fiberscope and the lecture scope are rotatable each other in this embodiment, so that the angles made by the splitting directions of individual quartz plates with the array direction of fibers are less important in comparison with those made by mutually splitting directions of individual quartz plates.

The fourth embodiment

Figure 10:
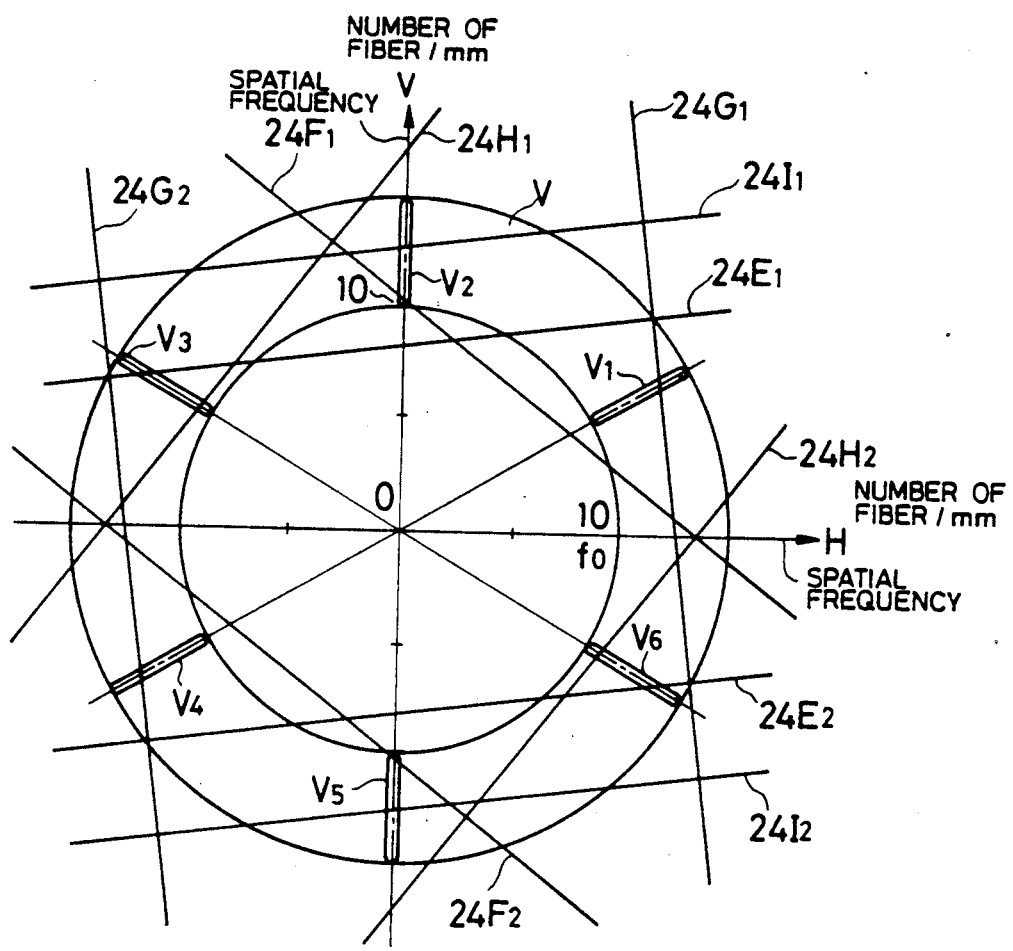
FIG. 10 is a view showing spatial frequency spectra and characteristics of an optical low-pass filter in a fourth embodiment of the present invention.
Figure 11A:
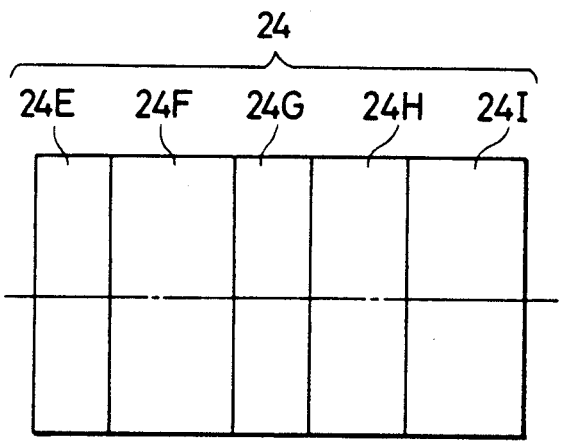
FIGS. 11A and 11B are views showing a structure of the optical low-pass filter in the fourth embodiment.
Figure 11B:
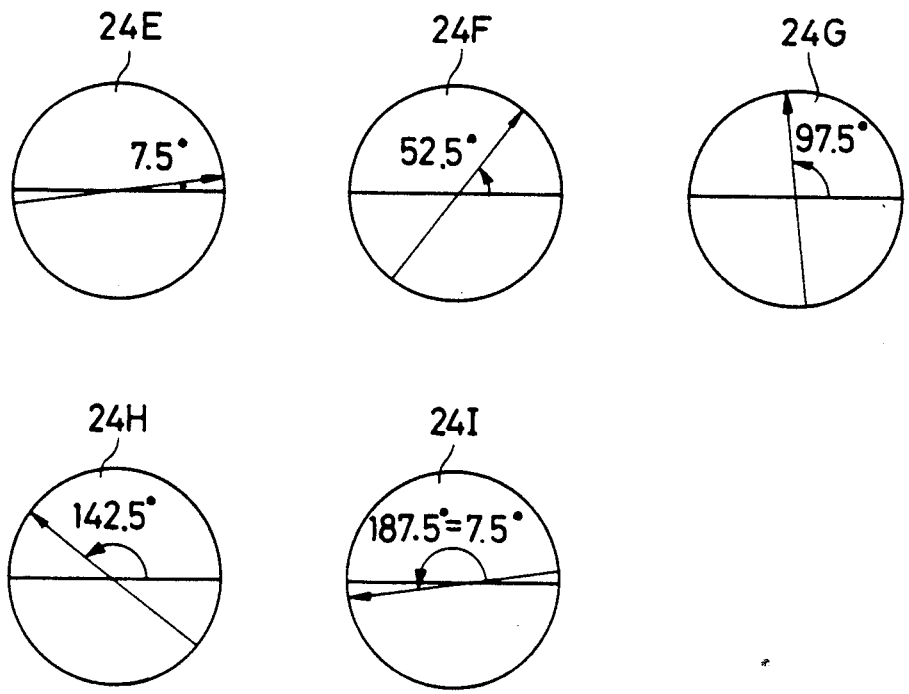

This embodiment is to observe an image formed by a fiberscope through a lecture scope as in the third embodiment, and the entire structure is precisely the same as that shown in FIG. 3. Accordingly, referring to FIGS. 3, 10, 11A, and 11B, an explanation will be made below. The spatial frequency spectrum components generated by the fiber array of the image formed on the entrance end face of the image guide fiber bundle 3 in relation to the entrance end face of the image guide fiber bundle 25 are distributed in an annular frequency area V shown in FIG. 10. The optical low-pass filter 24 for eliminating the generation of moiré attributable to such a state comprises five birefringent plates 24E, 24F, 24G, 24H, and 24I as illustrated in FIG. 11A. When individual plates are assumed to be formed from quartz plates as in the first embodiment, the splitting directions of individual plates make angles of 7.5°, 52.5°, 97.5°, 142.5°, and 187.5° with the array direction of fibers of the image guide fiber bundle 25 as shown in FIG. 11B and, if $f_0 = 10$ lines/mm, the thicknesses are 6.7 mm, 10.32 mm, 6.82 mm, 7.95 mm, and 10.32 mm, respectively. The arrangement of trap lines according to this formation is as shown in FIG. 10 and, for example, trap lines $24E_1$ and $24F_1$ make the response zero in the vicinity of the lower limit of the frequency area V. Although trap lines $24G_1$, $24H_1$ and $24I_1$ make further the response zero in the frequency area V, the relationship between the splitting directions of individual plates is adequately set so that the density of the trap lines is virtually uniform in the frequency area V. Specifically, respective vertexes of a first square formed by the trap lines of birefringent plates 24F and 24H exist in an annular frequency area V, respective sides of a second square formed by the trap lines of birefringent plates 24G and 24I are located in the vicinity of the vertexes of the first square, and the trap lines of a birefringent plate 24E intersect with the sides of the first square at their middle portions. This arrangement can prove that the fourth embodiment is superior to the third embodiment in an effect for preventing the moiré from being generated.

Although the structure that the TV camera and the adaptor are independent of each other has been described in the first and second embodiments, it is needless to say that the present invention is also applicable to the case where the image forming lens is incorporated in the body of the TV camera, as in a common TV camera. Further, although the exit end face of the image guide fiber bundle of the fiberscope is regarded as an object in all embodiments, a dot printed photograph or the like has likewise large spectrum components in a specific spatial frequency. Thus, even when such an object is photographed with the TV camera, the present invention is effective.

According to the present invention, it is intended that large spatial frequency spectrum components in the image of an object which cause the false signal and moiré are reduced, with the result that clear photographing and observation can always be secured.

What is claimed is;

1. An image forming optical system comprising an image forming lens for separately forming a plurality of object images, each said image having large spectrum components in a plurality of specific spatial frequencies different from each other; image receiving means performing discrete spatial sampling of said images; and an optical low-pass filter having trap lines such that at least one of said trap lines traverses substantially an area in which said plurality of specific spatial frequencies are distributed on a two-dimensional spatial frequency plane.

2. An image forming optical system according to claim 1, wherein said optical low-pass filter comprises a plurality of birefringent plates overlapping each other in a direction of an optical axis of said image forming optical system and each of said plurality of birefringent plates is constructed so that direction in which a ray of incident light is split into ordinary and extraordinary ray are different from each other by an angle which is an integral multiple of 45°.

3. An endoscope image pickup device comprising plural endoscopes provided with individual image guide fiber bundles; an image forming lens system through which images transmitted onto exit end faces of said image guide fiber bundles are separately formed; a solid state image pickup device receiving separately the images formed through said image forming lens system; and an optical low-pass filter arranged in an optical path between each of said exit end faces of said image guide fiber bundles and said solid state image pickup device, said optical low-pass filter having trap lines such that at least one of said trap lines traverses substantially an area in which spectrum components of specific spatial frequencies depending on an array of individual fibers in each of the images of said image guide fiber bundles formed on said solid state image pickup device through said image forming lens system are distributed on a two-dimensional spatial frequency plane.

4. An endoscope image pickup device according to claim 3, wherein said optical low-pass filter comprises a plurality of birefringent plates overlapping each other in a direction of an optical axis of said image forming lens system, and each of said plurality of birefringent plates is constructed so that directions in which a ray of incident light is split into ordinary and extraordinary ray are different from each other by an angle which is an integral multiple of 45°.

5. An endoscope image pickup device according to claim 4, wherein respective thicknesses and light ray splitting directions of said birefringent plates are determined so that at least two of said trap lines traverse substantially said area.

6. An endoscope image pickup device according to claim 4, wherein when a circle is drawn with a line connecting a point of the lowest spatial frequency included in said area to an origin of coordinate for its radius on the two-dimensional spatial frequency plane, respective thicknesses and light ray splitting directions of two birefringent plates of said plurality of birefringent plates are determined so that trap lines of said two birefringent plates make a square virtually circumscribed about said circle.

7. An endoscope image pickup device according to claim 6, wherein respective thicknesses and light ray splitting directions of another two birefringent plates of said plurality of birefringent plates are determined so that trap lines of said another two birefringent plates make a square virtually inscribed in said circle and so that a diagonal of said inscribed square makes an angle of 45° with that of said circumscribed square.

8. An endoscope image pickup device according to claim 4, wherein when a first circle is drawn with a line connecting a point of the highest spatial frequency included in said area to an origin of coordinate for its radius on the two-dimensional spatial frequency plane and a second circle is drawn with a line connecting a point of the lowest spatial frequency in said area to the origin for its radius thereon, respective thicknesses and light ray splitting directions of said plurality of birefringent plates are determined so that respective vertexes of a first square formed by trap lines of two birefringent plates of said plurality of birefringent plates exist in an annular frequency area formed by said first and second circles; so that respective sides of a second square formed by trap lines of other two birefringent plates of said plurality of birefringent plates are located in the vicinity of the vertexes of said first square; and so that trap lines of remaining one birefringent plate of said plurality of birefringent plates intersect with respective sides of said first square at middle portions thereof.

9. An endoscope observing device comprising an endoscope provided with a first image guide fiber bundle; and image forming lens system through which an image transmitted onto an exit end face of said first image guide fiber bundle is formed; a second image guide fiber bundle receiving the image formed through said image forming lens system on an entrance end face thereof; and an optical low-pass filter arranged in an optical path between said exit end face of said first image guide fiber bundle and said entrance end face of said second image guide fiber bundle, said optical low-pass filter having trap lines such that at least one of said trap lines traverses substantially an area in which spectrum components of specific spatial frequencies depending on an array of individual fibers in an image on said exit end face of said first image guide fiber bundle formed on said entrance end face of said second image guide fiber bundle through said image forming lens system are distributed on a two-dimensional spatial frequency plane.

10. An endoscope observing device according to claim 9, wherein said optical low-pass filter comprises a plurality of birefringent plates overlapping each other in a direction of an optical axis of said image forming lens system, and each of said plurality of birefringent plates is constructed so that directions in which a ray of incident light is split into ordinary and extraordinary rays are different from each other by an angle which is an integral multiple of 45°.

11. An endoscope observing device according to claim 10, wherein respective thicknesses and light ray splitting direction of said birefringent plates are determined so that at least two of said trap lines traverse substantially said area.

12. An endoscope observing device according to claim 10, wherein when a circle is drawn with a line connecting a point of the lowest spatial frequency included in said area to an origin of coordinate for its radius on the two-dimensional spatial frequency plane, respective thicknesses and light ray splitting directions of two birefringent plates of said plurality of birefringent plates are determined so that trap lines of said two birefringent plates make a square virtually circumscribed about said circle.

13. An endoscope observing device according to claim 12, wherein respective thicknesses and light ray splitting directions of another two birefringent plates of said plurality of birefringent plates are determined so that trap lines of said another two birefringent plates make a square virtually inscribed in said circle and so that a diagonal of said inscribed square makes an angle of 45° with that of said circumscribed square.

14. An endoscope observing device according to claim 10, wherein when a first circle is drawn with a line connecting a point of the highest spatial frequency included in said area to an origin of coordinate for its radius on the two-dimensional spatial frequency plane and a second circle is drawn with a line connecting a point of the lowest spatial frequency in area to the origin for its radius thereon, respective thicknesses and light ray splitting directions of said plurality of birefringent plates are determined so that respective vertexes of a first square formed by trap lines of two birefringent plates of said plurality of birefringent plates exist in an annular frequency area formed by said first and second circles; so that respective sides of a second square formed by trap lines of other two birefringent plates of said plurality of birefringent plates are located in the vicinity of the vertexes of said first square; and so that trap lines of remaining one birefringent plate of said plurality of birefringent plates intersect with respective sides of said first square at middle portions thereof.

* * * * *